United States Patent

[11] 3,556,295

| | | | | |
|---|---|---|---|---|
| [72] | Inventor | Hendrikus Gerhardus Muller Hengelo, Netherlands | | |
| [21] | Appl. No. | 807,319 | | |
| [22] | Filed | Mar. 14, 1969 | | |
| [45] | Patented | Jan. 19, 1971 | | |
| [73] | Assignee | N. V. Machinefabriek B & S Bedrijven v.d. Woerdt | | |
| [32] | Priority | Mar. 14, 1968 | | |
| [33] | | Netherlands | | |
| [31] | | 6,803,639 | | |

[54] APPARATUS FOR CLASSIFYING ARTICLES AND FOR REMOVING THEM FROM A CONVEYOR
12 Claims, 3 Drawing Figs.

[52] U.S. Cl. .................................................. 209/73, 209/90, 209/100
[51] Int. Cl. .................................................. B07c 5/06

[50] Field of Search........................................... 209/100, 103, 90; 198/(Inquired), 34; 209/73

[56] References Cited
FOREIGN PATENTS

| | | | |
|---|---|---|---|
| 212,619 | 3/1959 | Austria......................... | 209/100 |
| 1,128,263 | 9/1968 | Great Britain................ | 209/90 |

*Primary Examiner*—Allen N. Knowles
*Attorney*—Young & Thompson

ABSTRACT: Articles are removed from a belt conveyor or not, in one position or another according to their orientation, by a laterally oscillatable catching member that places them in the path of a pusher which moves them over a support having a portion that swings downwardly. If the articles are mispositioned on the support, they will fall from the edge left by the downwardly swung portion of the support.

APPARATUS FOR CLASSIFYING ARTICLES AND FOR REMOVING THEM FROM A CONVEYOR

The present invention relates to apparatus for classifying articles according to their size and shape on a conveyor, and for thereafter removing articles from the conveyor and again classifying them on the basis of their orientation or size or shape on a fixed horizontal support.

The invention is useful in general with articles that vary as to size or shape, and that are also irregular in shape in the sense that their center of gravity lies nearer one side of the article than the opposite side of the article. The apparatus will be disclosed hereinafter in connection with the handling of boiled shrimps, which need to be classified according to whether they have opened or straightened out too much during boiling, and from which smaller pieces of shrimp need to be removed, and which also need to be classified according to whether they are properly oriented or too large or too small for further conveyance and handling in high-speed automatic equipment.

It is an object of the present invention to provide apparatus which will remove from a conveyor only those articles which are of desired size or shape.

Another object of the present invention is the provision of apparatus which will separate articles of irregular shape according to their orientation on a support.

Finally, it is an object of the present invention to provide such apparatus that will be relatively simple and inexpensive to manufacture, easy and rapid to install, operate, maintain and repair, and rugged and durable in use.

Other objects and advantages of the present invention will become apparent from a consideration of the following description, taken in connection with the accompanying drawings, in which.

Figure 3:
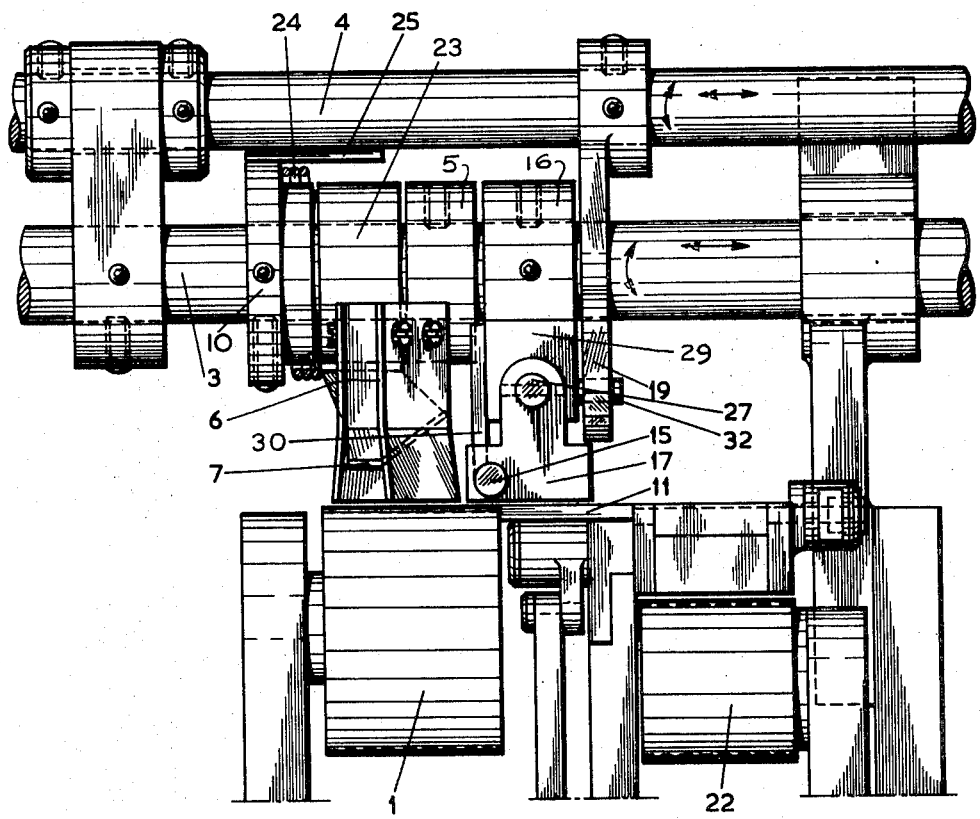
FIG. 3 is an end elevational view from the right of FIG. 2.

Referring now to the drawings in greater detail, there is shown apparatus for classifying articles and for removing them from a conveyor, according to the present invention, comprising an endless belt conveyor 1 that circulates beside a fixed frame 2. Journaled in frame 2 for oscillation about their axes and for axial reciprocation are a pair of shafts 3 and 4. Affixed to shaft 3 for movement therewith is a bracket 5 which carries a catching member 6. Catching member 6 is comprised by a pair of upwardly extending plates that depend from bracket 5 and which have lower edges spaced only a short distance above the upper surface of the upper run of conveyor 1. The plates which comprise catching member 6 converge in the general direction of movement of conveyor 1 thereby to provide a pair of upwardly extending walls in the form of a truncated V-shaped channel having a relatively wide open front and a relatively narrow open rear. These walls also converge upwardly for a purpose to be disclosed; and the wall which is on the left as seen in FIG. 3 has its lengthwise extent parallel to the direction of movement of conveyor 1.

Figure 1:
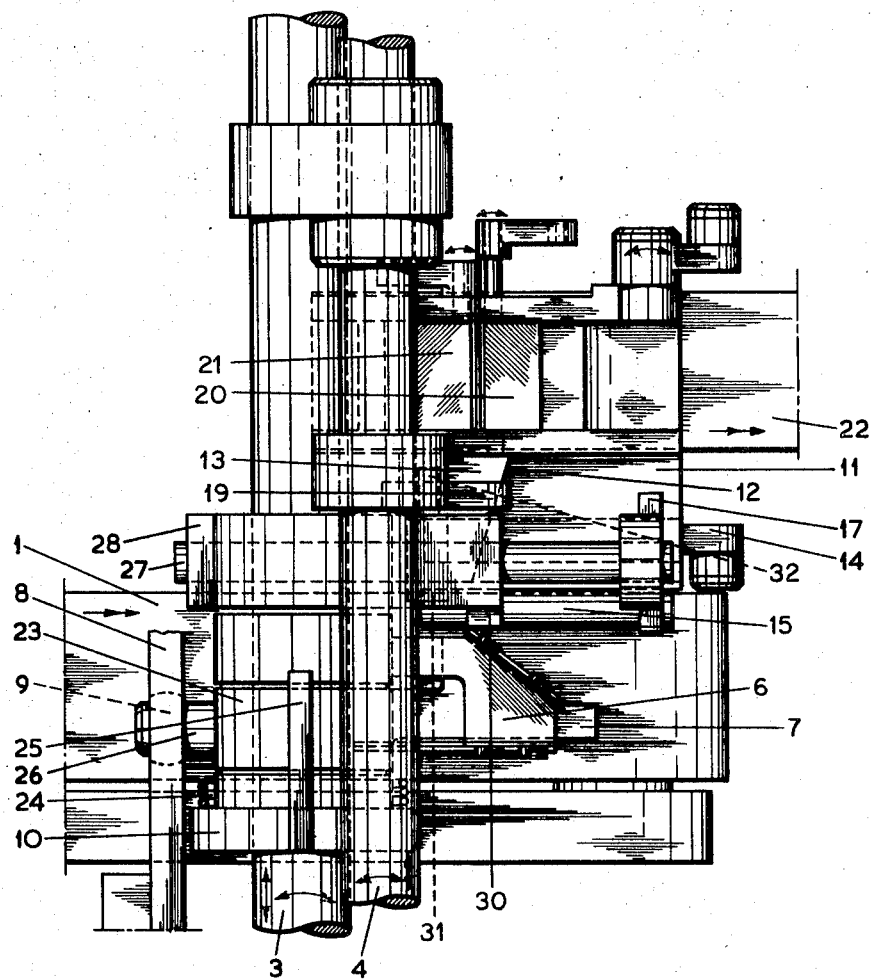
FIG. 1 is a top plan view of apparatus according to the present invention.
Figure 2:
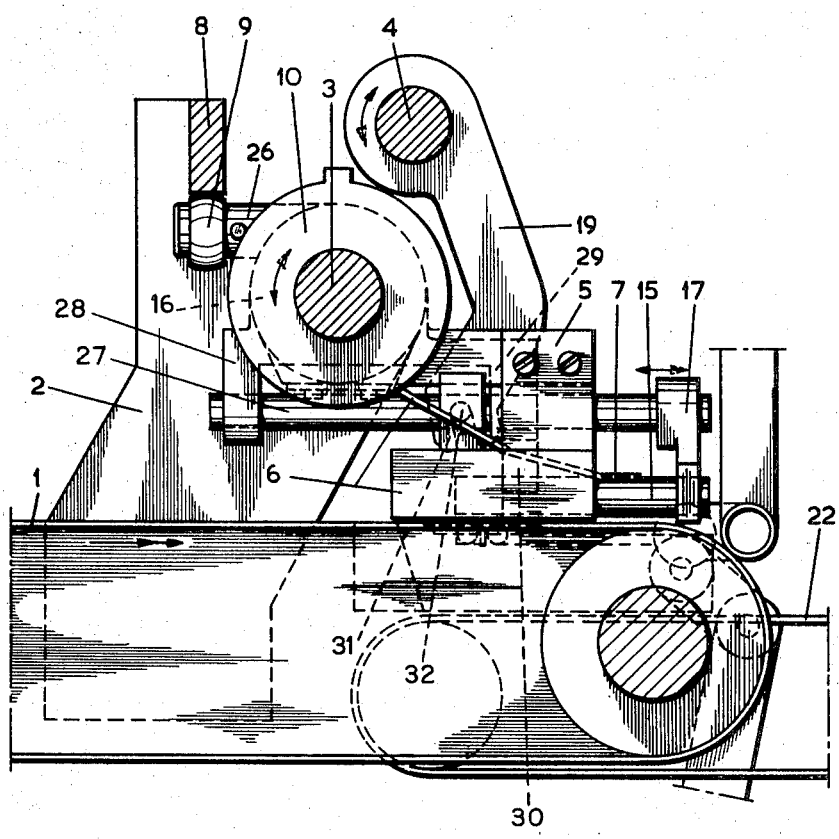
FIG. 2 is a side elevation view, with parts in section, of the structure of FIG. 1.

As shrimps and pieces of shrimps move to the right on conveyor 1 as seen in FIGS. 1 and 2, they enter the wide open end of catching member 6. Pieces of shrimp, undersized shrimps and shrimps that have straightened so much during the boiling process that they cannot be easily handled in subsequent apparatus, pass through the narrow rear end of catching member 6 and are discharged from the end of the conveyor. But those shrimps which have approximately the right size and shape, and shrimps which are too large, are caught by catching member 6.

Catching member 6 moves the shrimps laterally off conveyor 1. To this end, when catching member 6 is lowered over conveyor 1 in the position shown in the drawings, the shaft 3 is moved axially to the right as seen in FIG. 3, to move the shrimps off conveyor 1 and onto a horizontal support 11. The rear upright wall of catching member 6 during this transverse movement having its lengthwise extent parallel to conveyor 1, the catching member 6 has little or no tendency to change the orientation of the shrimps during this lateral movement. At the end of this lateral movement, the shaft 3 is oscillated about its axis to swing the catching member up to release the shrimp and leave it on support 11. The upward convergence of the sidewalls of the catching member 6 helps to ensure that the shrimp will be discharged and left on support 11, and will not become wedged between the walls of catching member 6.

In addition, a positive ejector 7 is provided, for making sure that shrimps do not become stuck in catching member 6. Ejector 7 is mounted on a sleeve 23 which is supported on shaft 3 for axial movement with shaft 3 but is rotatable relative to the shaft 3. Sleeve 23 has a laterally extending arm 26 thereon that carries a roller 9 that rolls on the horizontal undersurface of a member 8 carried by frame 2. A coiled torsion spring 24, coaxial with shaft 3, acts between sleeve 23 and a collar 10 fixed to shaft 3, continuously to urge sleeve 23 in a direction to cause roller 9 to press against member 8. Thus, during axial movement of shaft 3 in the lower position of catching member 6 and ejector 7, roller 9 continuously rides on the undersurface of member 8.

As soon as shaft 3 rotates counterclockwise as seen in FIG. 2, in order to raise catching member 6 and discharge the shrimp on support 11, bracket 5 and catching member 6 begin to swing upwardly; but sleeve 23 initially retains its FIG. 2 position while shaft 3 turns within sleeve 23. However, collar 10 is also turning with shaft 3 and collar 10 carries an arm 24 which, after a predetermined amount of turning of shaft 3, engages the arm 26 and causes sleeve 23 and ejector 7 to swing upwardly upon continued rotation of shaft 3.

As a result, the lower edges of catching member 6 will initially rise while ejector 7 remains stationary to eject a possibly stuck shrimp. When the lower edges of catching member 6 are about at the level of ejector 7, then ejector 7 will join catching member 6 in counterclockwise movement as seen in FIG. 2. With catching member 6 and ejector 7 in this raised position, shaft 3 is then moved again to the left as seen in FIG. 3, after which shaft 3 is oscillated clockwise as seen in FIG. 2 to return the parts to the position shown in the drawings.

The shrimp resting on support 11 can now be moved further to the right as seen in FIG. 3, by means of a pusher 15. Pusher 15 is in the form of a bar which is parallel to the direction of movement of conveyor 1 and perpendicular to shaft 3 and hence has little tendency to change the position of the shrimp as it moves across support 11. Pusher 15 is carried by a downwardly depending support 30 which in turn is fixed to a bracket 16 which is fixed to shaft 3. Bracket 16 also carries a pair of bushings 28 and 29 which are in spaced axial alignment with each other. A rod 27 is mounted for axial sliding movement in and relative to bushings 28 and 29. A slide 17 is fixedly secured to an end of rod 27 and slides on and relative to pusher 15.

Rod 27 carries a block 31 secured thereon, and block 31 carries a laterally extending pin 32 over which is engaged a lower end of a downwardly extending fork 19 that at its upper end is fixedly secured to shaft 4. Shafts 3 and 4 move axially together but are rotatable relative to each other.

At the beginning of the rightward stroke of pusher 15 as seen in FIG. 3, slide 17 moves to the left as seen in FIG. 2 to correct any possible mispositioning of the shrimp lengthwise of pusher 15, and also to help maintain the orientation of the shrimp unchanged while the shrimp is being pushed across support 11 by pusher 15.

Support 11 itself provides a means for classifying shrimps according to size and/or orientation. To this end, support 11 is divided along a line 12 as seen in FIG. 1; and an upstream portion 13 of support 11 is mounted for vertical swinging movement about a horizontal axle disposed adjacent but beneath the right-hand end of support 11 as seen in FIG. 1, this axle being parallel to shafts 3 and 4 and oscillatable about its axis under the influence of an arm 14. Shrimps which are too big, or which are misoriented or incorrectly positioned on the support, will have their centers of gravity to the left of line 12 as seen in FIG. 1. But properly positioned shrimps, properly oriented and of the proper size, will have their centers of gravity to the right of line 12 in FIG. 1. Portion 13 swings down briefly during the advancing movement of the bar 15, so that the undesired shrimps with their centers of gravity to the left of line 12 will topple off the edge of support 11 into the gap provided by the downward swinging movement of portion 13 and be reconveyed for reorientation or other use. Portion 13 then closes, and the desirable shrimps continue to be conveyed across support 11.

Pusher 15 and slide 17 thus move to the right as seen in FIG. 3 simultaneously with catching member 6. Catching member 6 is moving a shrimp off conveyor 1 and onto support 11 in the path of pusher 15, at the same time that pusher 15 is moving another shrimp over support 11 and onto a discharge mechanism seen at the right of FIG. 3 and the top of FIG. 1, in the form of a pair of oppositely downwardly swinging plates 20 and 21 which deliver shrimps to a subjacent belt conveyor 22 and in the process ensure that all the shrimps on conveyor 22 will be oriented the same way. The structure at 20, 21 and 22 is described in greater detail in the copending application filed under even date herewith and entitled "Apparatus for Feeding Articles to a Conveyor in Uniformly Oriented Condition". The movements of bar 15 thus duplicate those of catching member 6.

The line 12 of division between support 11 and its vertically swinging portion 13 can be perpendicular to the direction of travel of the conveyors 1 and 22 and perpendicular to the lengthwise extent of pusher 15. In the embodiment shown, however, the line 12 is at an acute angle to the conveyors 1 and 22 and the bar 15, because shrimps have variations in form which can be made the basis of a classification operation according to the inclination of this line 12. Thus, the downwardly swinging portion 13 is useful to remove shrimps which are too big and those having certain undesirable variations of form, as well as those that are misoriented in a certain way. Also, this portion of the structure removes the upstream one of two shrimps which may have temporarily stuck to each other or whose antennas may have become entangled.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

I claim:

1. Apparatus for classifying articles, comprising a conveyor, a catching member disposed above the conveyor in the path of articles on the conveyor, the catching member being V-shaped and having upright walls that converge in the direction of movement of the conveyor, a support beside the conveyor and having its uppersurface coplanar with the conveyor, means for moving said catching member laterally of the conveyor to move the article off the conveyor and onto said support and for moving the article over said support, and means mounting a portion of said support for downward movement relative to the rest of the support so that articles whose center of gravity is undesirably positioned on said support will fall away.

2. Apparatus as claimed in claim 1, said V-shaped catching member being open at its rear to permit undesirably shaped and undesirably small articles to pass through the catching member and continue on the conveyor.

3. Apparatus as claimed in claim 1, the wall of said catching member which is to the rear during lateral movement of the catching member being parallel to the direction of conveyor movement.

4. Apparatus as claimed in claim 1, said downwardly movable portion of said support being an upstream portion of said support with respect to the direction of conveyor movement.

5. Apparatus as claimed in claim 1, and a pusher movable over said support, means mounting said pusher for movement with said catching member in a rectangular path disposed in a vertical plane perpendicular to the direction of conveyor movement with the stroke of said catching member and said pusher being of a length such that the catching member first moves the article into the path of the pusher and then the pusher moves the article over and off the support.

6. Apparatus as claimed in claim 1, the line of division between said portions of said support being disposed at an acute angle to the path of article movement across the support.

7. Apparatus for classifying articles, comprising a conveyor, a horizontal support disposed at one side of and coplanar with the conveyor, means for moving articles laterally off the conveyor onto the support and for moving articles across the support in a direction perpendicular to the direction of conveyor movement, the support having a portion which is downwardly movable relative to the rest of the support such that articles moving across the support and having their centers of gravity undesirably positioned will fall from the support when said portion is downwardly moved.

8. Apparatus as claimed in claim 7, said moving means including a pusher parallel to the direction of conveyor movement, and means for moving said pusher horizontally across said support in a direction perpendicular to the direction of conveyor movement.

9. Apparatus as claimed in claim 8, and a slide movable relative to the pusher in a direction parallel to the direction of conveyor movement for positioning articles along the length of the pusher.

10. Apparatus as claimed in claim 7, said downwardly movable portion of said support in its uppermost position being coplanar with and contiguous to the rest of the support along a line disposed at an acute angle to the direction of conveyor movement.

11. Apparatus for classifying articles, comprising a horizontal support, means mounting a portion of the horizontal support for downward movement relative to the rest of the support, a pusher movable horizontally across the support, and a slide movable relative to the pusher in a direction perpendicular to the direction of movement of the pusher to position articles along the pusher so that articles having their center of gravity undesirably positioned will topple off the support when said downwardly movable portion of the support is lowered.

12. Apparatus as claimed in claim 11, said downwardly movable portion of said support in its uppermost position being coplanar with and contiguous to the rest of the support along a line disposed at an acute angle to the direction of movement of said pusher.